United States Patent [19]

Michaud

[11] Patent Number: 5,264,884
[45] Date of Patent: Nov. 23, 1993

[54] COMPACT CAMERA WITH DEPLOYABLE FLASH UNIT

[75] Inventor: Patricia F. Michaud, Winsted, Conn.

[73] Assignee: Eastman Kodak Company, Rochester, N.Y.

[21] Appl. No.: 925,049

[22] Filed: Aug. 5, 1992

[51] Int. Cl.⁵ .............................................. G03B 15/03
[52] U.S. Cl. .................... 354/149.11; 354/288
[58] Field of Search .................... 354/126, 149.11, 288

[56] References Cited

U.S. PATENT DOCUMENTS

| | | | |
|---|---|---|---|
| 3,273,479 | 9/1966 | Jakob | 354/149.11 |
| 4,350,420 | 9/1982 | Engelsmann et al. | 354/149.11 |
| 4,734,733 | 3/1988 | Clapp et al. | 354/414 |
| 4,893,140 | 1/1990 | Yamamoto et al. | 354/149.11 |

Primary Examiner—David M. Gray
Attorney, Agent, or Firm—Roger A. Fields

[57] ABSTRACT

In a compact camera having a flash unit that is flipped up from the camera body to separate the flash unit from a taking lens to reduce the possibility of red-eye during exposure, the flash unit is supported for further movement to increase its separation from the taking lens.

4 Claims, 4 Drawing Sheets

COMPACT CAMERA WITH DEPLOYABLE FLASH UNIT

BACKGROUND OF THE INVENTION

1. Field of the Invention

The invention relates generally to the field of photography, and in particular to a compact camera with a deployable or extendable flash unit. More specifically, the invention relates to a compact camera having a flash unit that is flipped up from the camera body to be used and is flipped down against the camera body for storage.

2. Description of the Prior Art

A current trend in most camera design is to incorporate an electronic flash unit in the camera housing and yet make the housing relatively small in order to improve its ease of storage, portability and handling. As a consequence of making the camera housing small, however, the separation between the built-in flash unit and the taking lens is reduced, which possibly creates an undesirable effect commonly known as "red-eye". When using a flash unit and color print film, red-eye is typified by the pupils in the eyes of a person being photographed coming out red-tinted on a resulting color print. This phenomenon is attributable to the incidence into the taking lens of the red light reflected from the retinas in the person's eyes illuminated by the flash light.

Red-eye may be substantially avoided by increasing the separation between the flash unit and the taking lens. As a result, the light emitted from the flash unit will reach the eyes of a person being photographed at too great an angle to be reflected by his or her retinas into the taking lens. In this connection, prior art U.S. Pat. No. 4,545,661, issued Oct. 8, 1985, discloses a folding camera wherein a housing cover portion including a taking lens and a flash unit is pivotable relative to a housing main portion between a closed or folded portion in which the taking lens and the flash unit are concealed within the housing main portion and an open or unfolded position in which the taking lens and the flash unit are elevated above the housing main portion. Once the housing cover portion is raised to its open position, the flash unit can be popped out of the housing cover portion to increase the separation between the flash unit and the taking lens. Other prior art patents, such as U.S. Pat. Nos. 4,557,571, issued Dec. 10, 1985, and 4,996,548, issued Feb. 26, 1991, each disclose a compact camera wherein a flash unit is flipped up from a storage position in front of a taking lens to an operative position elevated from the taking lens.

PROBLEM TO BE SOLVED BY THE INVENTION

The known prior art patents appear to suggest the use of only a single means for separating the flash unit from the taking lens in a camera housing that is relatively small, to substantially avoid red-eye. Thus, the separation between the flash unit and the taking lens is limited for the compact cameras disclosed in U.S. Pat. Nos. 4,545,661, 4,557,571 and 4,996,548.

SUMMARY OF THE INVENTION

According to the invention, a compact camera comprising a taking lens, a flash unit, and first support means supporting the flash unit for movement relative to the taking lens to separate the flash unit a certain distance from the taking lens, is characterized by:

second support means supporting the first support means for movement relative to the taking lens to separate the first support means a certain distance from the taking lens in order to increase the total distance the flash unit can be separated from the taking lens.

More specifically, a compact camera comprising a camera body with a taking lens, a flash unit, and pivot means supporting the flash unit for swinging movement relative to the camera body and the taking lens about a pivot axis between a storage position in which the flash unit is integrated substantially with the camera body and a raised position in which the flash unit is elevated a certain distance from the taking lens, is characterized by:

conveyance means supporting the pivot means for translational movement to elevate the pivot axis a certain distance from the taking lens in order to increase the total distance the flash unit can be elevated from the taking lens when the flash unit is swung from its storage position to its raised position.

DETAILED DESCRIPTION OF THE PREFERRED EMBODIMENT

The invention is disclosed as being embodied in a compact 35 mm camera with a deployable electronic flash unit. Because such photographic cameras are well known, this description is directed in particular to camera elements forming part of or cooperating directly with the preferred embodiment. It is to be understood, however, that camera elements not specifically shown or described may take various forms known to persons of ordinary skill in the art.

Figure 1:
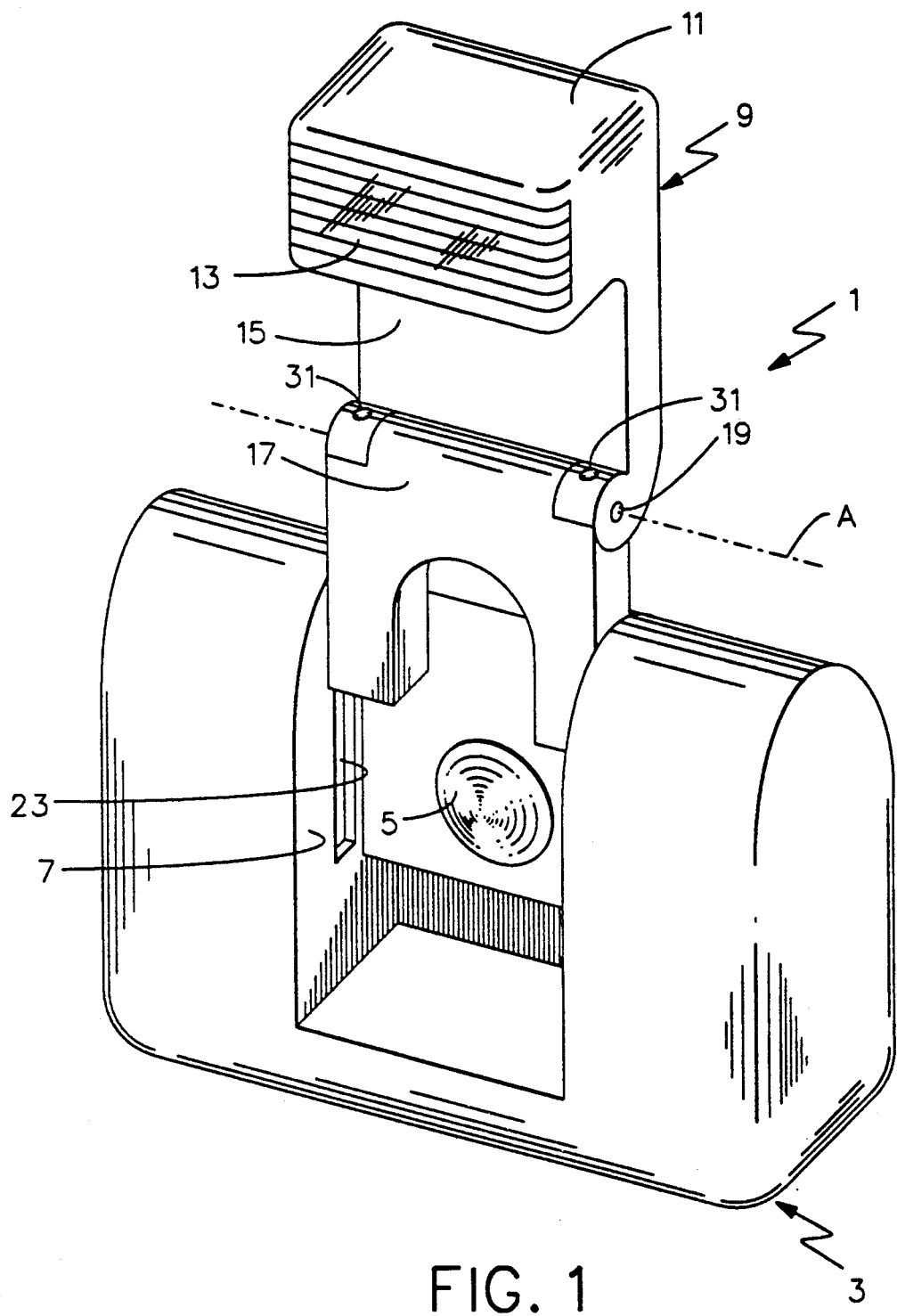
FIG. 1 is a front perspective view of a compact camera with a deployable flash unit according to a preferred embodiment of the invention, showing the flash unit deployed to a final raised (operative) position.

Referring now to the drawings, FIG. 1 shows a compact 35 mm camera 1 comprising a camera body or housing 3 that has a conventional taking lens 5 located within a front recess 7 formed in the camera body and a flip-up electronic flash unit 9. The flash unit 9 includes a head portion 11 having a flash emission window 13 and it includes a substantially flat leg portion 15 for the head portion. The leg portion 15 is pivotally connected to a substantially flat base 17, inside the front recess 7 in the camera body 3, by means of an axial pin 19 that extends through a bearing opening (not shown) in the base. The pivotal connection of the leg portion 15 to the base 17 permits the flash unit 9 to be manually swung relative to the camera body 3 about a pivot axis A between a folded storage position shown in FIG. 2 and an unfolded or initial raised (intermediate) position shown in FIG. 3. In the storage position, the leg portion 15 rests partly against the base 17, covers the taking lens 5 to protect the lens, and fits within the front recess 7 to be integrated with the camera body 3, and the head portion 11 is located beneath the base with its window 13 facing the camera body 3 and (like the leg portion) fits within the front recess to be integrated with the camera body. In the initial raised (intermediate) position, the head portion 11 is elevated a certain distance above the taking lens 5 with the window 11 facing a subject to be photographed. This is the typical position known prior art patents such as U.S. Pat. No. 4,996,548 appear to suggest. However, according to the invention, preferably the base 17 has a pair of aligned side projections 21 (only one shown) that extend into respective parallel channels 23 (only one shown) cut in the camera body 3 at opposite sides of its front recess 7 to support the base for sliding or translational movement relative to the camera body to elevate the pivot axis A a certain distance from the taking lens 5. Consequently, the flash unit 9, when in its initial raised (intermediate) position shown in FIG. 3, can be lifted to a final raised (operative) position shown in FIGS. 1 and 4 in order to increase the total distance the flash unit can be elevated from the taking lens 5. As can be appreciated by looking at FIG. 2, the camera body 3 prevents the flash unit 9 from being lifted to the final raised (operative) position when the flash unit is in its folded storage position.

Figure 2:
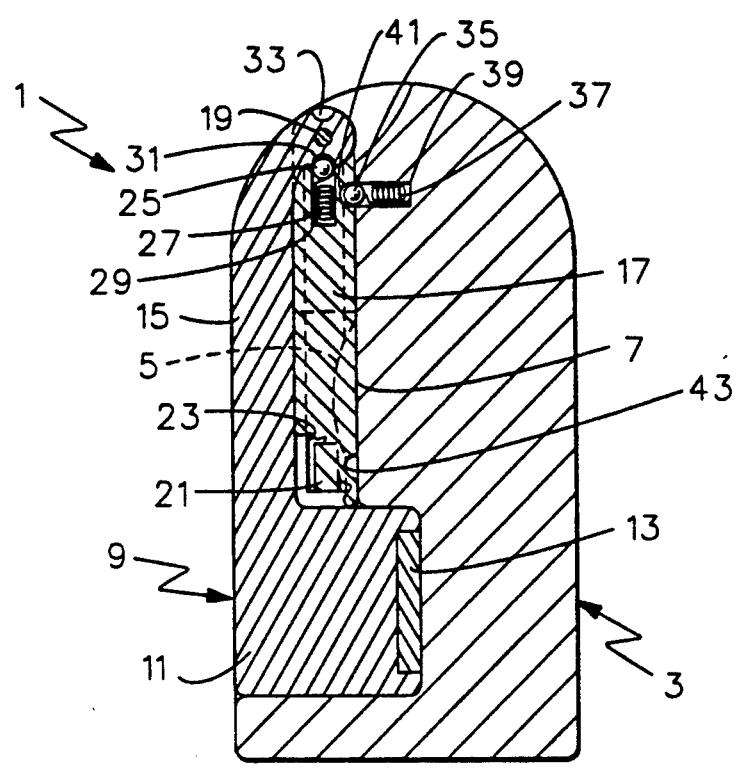
FIG. 2 is side sectional view of the compact camera, showing the flash unit in a storage position.
Figure 3:
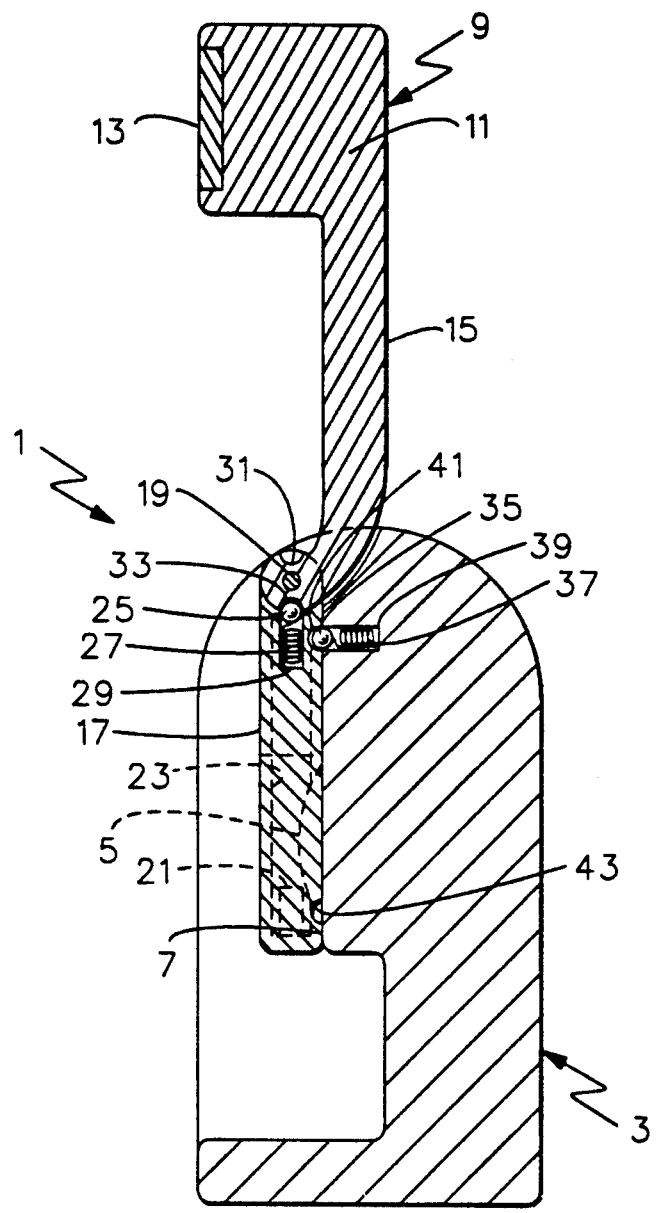
FIG. 3 is a side sectional view similar to FIG. 2, showing the flash unit in an initial raised (intermediate) position.
Figure 4:
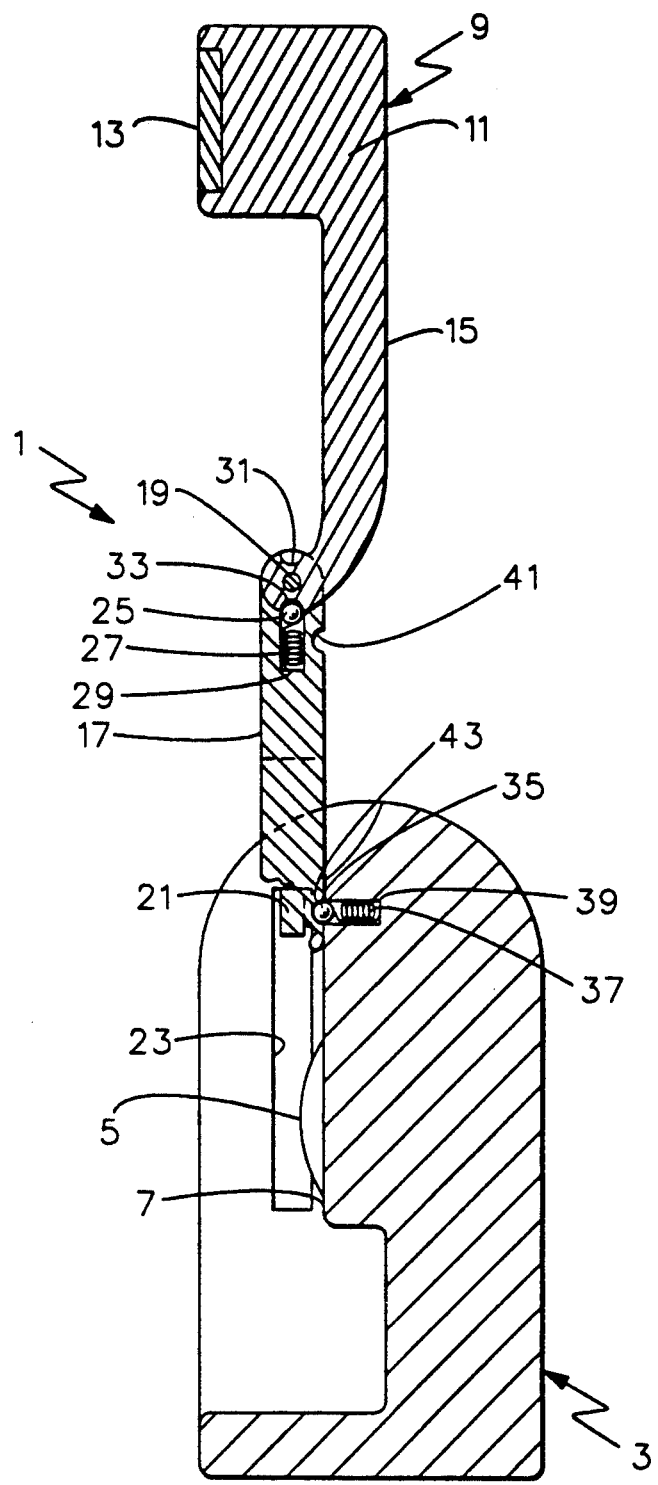
FIG. 4 is a side sectional view similar to FIG. 2, showing the flash unit in the final raised position.

Locking means for releasably securing the flash unit 9 in its storage position, its initial raised (intermediate) position and its final raised (operative) position are shown in FIGS. 2, 3 and 4. Specifically, the locking means comprises a ball 25 biased by a compression spring 27 to slightly protrude from a well 29 formed in the base 17, alternative cavities 31 and 33 formed in the leg 15, a ball 35 biased by a compression spring 37 to slightly protrude from a well 39 formed in the camera body 3 at the front recess 7, and alternative cavities 41 and 43 formed formed in the base 17. When the flash unit 9 is in its storage position shown in FIG. 2, the ball 25 resides in the cavity 31 and the ball 35 resides in the cavity 41 to releasably secure the flash unit in that position. When the flash unit 9 is in its initial raised (intermediate) position shown in FIG. 3, the ball 25 resides in the cavity 33 and the ball 35 resides in the cavity 41 to releasably secure the flash unit in that position. When the flash unit 9 is in its final raised (operative) position shown in FIG. 4, the ball 25 resides in the cavity 33 and the ball 35 resides in the cavity 43 to releasably secure the flash unit in that position.

The invention has been described with reference to a preferred embodiment. However, it will be appreciated that various modifications can be effected within the ordinary skill in the art without departing from the scope of the invention.

I claim:

1. A compact camera comprising a taking lens, a flash unit, and first support means supporting said flash unit for movement relative to said taking lens to separate the flash unit a first distance from the taking lens, is characterized by:

second support means supporting said first support means for movement relative to said taking lens to separate the first support means a second distance from the taking lens in order to increase the total distance said flash unit can be separated from the taking lens; and means for prevention said first supporting means from being moved until after said flash unit is moved.

2. A compact camera comprising a camera body with a taking lens, a flash unit, and pivot means supporting said flash unit for swinging movement relative to said camera body and said taking lens about a pivot axis between a storage position in which the flash unit is integrated substantially with the camera body and a raised position in which the flash unit is elevated a first distance from the taking lens, is characterized by:

conveyance means supporting said pivot means for translational movement to elevate said pivot axis a second distance from said taking lens in order to increase the total distance said flash unit can be elevated from the taking lens when the flash unit is swung from its storage position to its raised position; and means for preventing said pivot means from being translated to elevate said pivot axis until after said flash unit is swung about the pivot axis.

3. A compact camera as recited in claim 2, wherein said pivot means includes a base pivotally connected to said flash unit to permit the flash unit to be swung relative to said base about said pivot axis between the storage and raised positions, and said conveyance means includes integral means connecting said base and said camera body to permit the base to be translated along the camera body to only partially elevate the base from the camera body.

4. A compact camera as recited in claim 3, wherein said flash unit includes a leg portion pivotally connected to said base and a head portion having a flash emission window, and said pivot means is adapted to locate said leg portion substantially against said base and said head portion beneath said base with said window facing said camera body when said flash unit is located in its storage position.

* * * * *